(12) United States Patent
Stössl et al.

(10) Patent No.: US 12,202,713 B2
(45) Date of Patent: Jan. 21, 2025

(54) CHANGE SYSTEM FOR LOADING CRANES

(71) Applicant: OilQuick Deutschland KG, Steindorf (DE)

(72) Inventors: Martin Stössl, Rupertsbuch Schernfeld (DE); Michael Kollmann, Egling an der Paar (DE)

(73) Assignee: OilQuick Deutschland KG, Steindorf (DE)

( * ) Notice: Subject to any disclaimer, the term of this patent is extended or adjusted under 35 U.S.C. 154(b) by 924 days.

(21) Appl. No.: 17/146,827

(22) Filed: Jan. 12, 2021

(65) Prior Publication Data

US 2021/0214192 A1 Jul. 15, 2021

(30) Foreign Application Priority Data

Jan. 13, 2020 (DE) ...................... 10 2020 100 519.9

(51) Int. Cl.
*E02F 3/96* (2006.01)
*B66C 1/00* (2006.01)
(Continued)

(52) U.S. Cl.
CPC ................ *B66C 3/005* (2013.01); *B66C 1/00* (2013.01); *B66C 13/00* (2013.01); *E02F 3/96* (2013.01);
(Continued)

(58) Field of Classification Search
CPC ........ E02F 3/96; B66C 3/005; F16B 2200/89; F16B 2200/91; Y10T 403/22; Y10T 403/25; Y10T 403/253
See application file for complete search history.

(56) References Cited

U.S. PATENT DOCUMENTS 4,664,588 A * 5/1987 Newell ................ B23Q 1/0063
414/730
4,854,777 A * 8/1989 Lemoine ............... B63B 21/502
403/330
(Continued)

FOREIGN PATENT DOCUMENTS

DE 3135150 C1 1/1983
DE 40 10 070 * 11/1991 ............. B23K 37/04
(Continued)

OTHER PUBLICATIONS

Result of Examination Report for German Patent Application No. 10 2020 100 519.9, filed Jan. 13, 2020.

*Primary Examiner* — Michael P Ferguson
(74) *Attorney, Agent, or Firm* — Paul D. Bianco; Katharine Davis Wong; Fleit Intellectual Property Law

(57) ABSTRACT

A system for changing work tools on a loading crane includes a first coupling member on the work tool side or the loading crane side with a receiving opening and a second coupling member on the loading crane side or the work tool side with a guide member extending along a longitudinal axis. The guide member engages in the receiving opening by moving the first and second coupling members toward each other. The first coupling member comprises a support surface for axially abutting the second coupling member and the second coupling member comprises a bearing surface complementary to the support surface and a locking element which is movable by a drive between disengaged and engaged positions. The locking element has a clamping surface for frictionally abutting the first coupling member and the first coupling member has an abutment surface complementary to the clamping surface for zero-play axial clamping of the first and second coupling members.

17 Claims, 3 Drawing Sheets

(51) Int. Cl.
 *B66C 3/00* (2006.01)
 *B66C 13/00* (2006.01)
(52) U.S. Cl.
 CPC ....... *F16B 2200/89* (2023.08); *F16B 2200/91* (2023.08)

(56) References Cited

U.S. PATENT DOCUMENTS

| | | | | |
|---|---|---|---|---|
| 6,163,988 | A | * | 12/2000 | Pratt ................... E02F 3/3609 403/14 |
| 7,963,717 | B2 | * | 6/2011 | Seger ................... F16B 21/165 403/322.2 |
| 10,519,620 | B2 | | 12/2019 | Freidrich |

FOREIGN PATENT DOCUMENTS

| | | |
|---|---|---|
| DE | 41 11 522 A1 | 10/1992 |
| DE | 20 2015 008 410 U1 | 1/2016 |
| DE | 20 2016 000 930 U1 | 5/2017 |

* cited by examiner

CHANGE SYSTEM FOR LOADING CRANES

FIELD OF THE DISCLOSURE

The present disclosure relates to a system for changing work tools on a loading crane.

BACKGROUND

Loading cranes are used, among other things, to move loads onto transport vehicles or trailers. Such cranes can be stationary or mobile loading cranes. Loading cranes are frequently mounted directly on the transport vehicle or trailer.

Crane loading operations may involve, e.g., loading felled logs or tree branch waste in the forestry industry, loading palleted loads or loads stored in sacks, or loading bar stock in the construction or logistics industry. Different loads require work tools customized to the specific load, or, more specifically, load grabbers, e.g., gripper-like, claw-like or fork-like tools with or without a rotary drive (rotator) for aligning the load grabber relative to the load to be picked up. In some cases, this operation requires frequent changes of the work tool or load grabber. To make it easier to change the work tools, a variety of different quick couplers are used.

DE 3 135 150 C1 describes a generic quick coupler for coupling work tools to sticks of hydraulic excavators. The prior art quick coupler comprises a substantially rotation-symmetrical coupling member on the loading crane side, said coupling member being retracted via a pin-shaped guide member into a complementary cup-shaped receiving element on the work tool side and interlockingly retained by means of a hydraulically actuated locking mechanism. To lock or interlockingly retain the coupling members, a bolt-shaped locking element, which is movably disposed on the coupling member on the work tool side, is retracted into a receiving element in the form of a transverse bore in the pin-shaped guide member of the coupling member on the loading crane side.

Quick couplers of this type ensure a quick change of work tools while meeting the user's requirement for the most direct possible transmission of force and zero-play connection between the loading crane and the work tool.

SUMMARY

Thus, one aspect of the disclosure relates to a suitable system for changing work tools on a loading crane, by means of which the transmission of force and the connection between the loading crane and the work tool can be improved.

Useful embodiments and further advanced modifications are also disclosed.

The disclosed system for changing work tools on a loading crane comprises a first coupling member on the loading crane side or on the work tool side having a receiving opening and a second coupling member on the loading crane side or on the work tool side, respectively, having a guide member which extends along a longitudinal axis and which can be made to engage in the receiving opening of the first coupling member by moving the first coupling member and the second coupling member toward each other in the direction of the longitudinal axis. The first coupling member has a support surface for axially abutting the second coupling member, and the second coupling member has a bearing surface complementary to the support surface and at least one locking element which can be moved by means of a drive at right angles relative to the longitudinal axis of the second coupling member between a disengaged position and a retaining position. The locking element has a clamping surface for frictionally abutting the first coupling member. The first coupling member has an abutment surface complementary to the clamping surface for zero-play axial clamping of the first coupling member and the second coupling member. The interaction between the clamping surface and the abutment surface ensures axial clamping and a direct transmission of force so that the second coupling member can be coupled with zero play to or by the first coupling member and be moved with said first coupling member. This allows precise movements of the work tool to be executed and ensures a high positioning accuracy of the work tool. Furthermore, the vibration-induced wear and tear or abrasion of the contacting surfaces on the first and second coupling member can be reduced. In addition, because of axial clamping, a unique load capacity for torques is achieved since torques can be frictionally transmitted via the support surface and the abutment surface, thus ensuring that the locking elements in particular do not have to transmit any torques.

Preferably, the first coupling member is disposed on the work tool, and the second coupling member is disposed on the loading crane. However, in the context of the present invention, the loading crane side and the work tool side are considered to be interchangeable. The first coupling member could also be disposed on the loading crane and the second coupling member on the work tool.

In a particularly preferred embodiment, the clamping surface on the locking element and the abutment surface on the first coupling member are designed as mutually corresponding inclined surfaces having a mutual angle of inclination. This makes it possible to achieve an especially good wedge effect for generating an axial pull-in force. The locking element can also have an additional clamping surface as a reserve clamping surface. This reserve clamping surface can be utilized by rotating the locking element about its longitudinal axis.

The support surface on the first coupling member and the associated bearing surface on the second coupling member are preferably designed as conical surfaces. This makes it possible to obtain an optimum bearing surface and to precisely align and center the two coupling members when connecting them. The support surface and the bearing surface can be inclined, e.g., at an angle of 20° to 50°, preferably at an angle of 30°, relative to the central axis of the first coupling member and the longitudinal axis of the second coupling member. However, the support surface and the bearing surface can also be designed as plane surfaces.

Pairing of the clamping surface on the locking element and the abutment surface on the first coupling member can preferably be designed so to ensure the self-locking fixation of the locking element in the retaining position. This prevents the locking element from being disengaged by itself when the two coupling members are in the coupled and locked position. Self-locking can be achieved by ensuring that the clamping surface and the abutment surface have a suitable inclination. In a potential embodiment of the invention, the clamping surface can be inclined at an angle β of approximately 30° relative to the longitudinal axis of the locking element. The abutment surface on the first coupling member complementary to the clamping surface can also be inclined at an angle of 30° relative to an axis at right angles to the central axis of the first coupling member.

In an advantageous embodiment of the invention, the first coupling member has a cup-shaped main body with a central axis and a circular receiving opening concentric with the central axis. The second coupling member can have a disk-shaped upper part and a cylindrical guide member extending along the longitudinal axis for engaging in the receiving opening of the first coupling member.

Preferably, at least one positioning and aligning element for positioning the angle of the two coupling members is disposed on the guide member of the second coupling member and on the receiving opening of the first coupling member. In this manner, a defined angular position for engaging the guide member in the receiving opening of the first coupling member is predetermined. Thus, it can be ensured that the plug-in connectors disposed on the first coupling member are correctly coupled to the respective mating connectors on the second coupling member. This also provides protection against an unwanted rotation of the first and the second coupling member.

Preferably, two diametrically opposed locking elements are disposed on the second coupling member. This ensures clamping in the center and a uniform force distribution. However, it is also possible to provide only one locking element or more than two locking elements. Using a plurality of locking elements can reduce the relative load on a locking element as compared to an embodiment having only one locking element. It also makes more uniform force distribution possible.

A further advantage can be obtained by disposing suitable damping elements on the first or the second coupling member for the purpose of damping shocks when the two coupling members are being coupled to each other. Using the damping elements, shock-induced damage can be avoided. The damping elements, which are advantageously disposed between the first and the second coupling member, can be, e.g., elastically deformable elastomer blocks. It is also possible to use springs or differently designed damping elements.

The drive for moving the at least one locking element can preferably be a hydraulic drive with a piston which moves inside a piston chamber. However, it is also possible to use a pneumatic, electric or other drive. The piston, which can preferably be actuated from both ends, and a through-opening inside the guide member for axially guiding the piston, can advantageously have a noncircular cross section. A noncircular cross section allows an angular position of the locking element in the guide member to be uniquely defined and protected against rotation. This is an easy way of ensuring that the clamping surface on the locking element is always correctly positioned. The cross section can be, e.g., slightly elliptical or polygonal, e.g., in the form of a hexagon or octahedron. Other means of preventing rotation are also possible.

It is particularly advantageous if the locking element is integrally formed in one piece with the piston. In this manner, it is possible to simplify the drive.

In a further advantageous embodiment, a visual display for monitoring the correct locking position can be disposed on the first coupling member or on the second coupling member.

Mating supply ports, particularly in the form of a power supply coupler or a hydraulic quick coupler, can be disposed on the first coupling member and the second coupling member. This enables the work tool in particular to be supplied with a hydraulic fluid and/or current. As an alternative or in addition thereto, it is also possible to connect hydraulic actuators or energy consumers in or on the second coupling member, e.g., in the form of a rotary drive (rotator) attached to the second coupling member or integrated into the second coupling member, by means of which rotary drive a work tool can be rotated relative to the coupler axis. The hydraulic actuator or energy consumer can also be, for example, a locking element additionally integrated into the second coupling member so as to create an interlocking or friction-locked connection between the first and the second coupling member.

BRIEF DESCRIPTION OF THE DRAWINGS

Additional features and advantages of the disclosed system will become apparent from the following description of a preferred illustrative embodiment, with reference to the drawings.

The drawings show.

DETAILED DESCRIPTION

Figure 1:
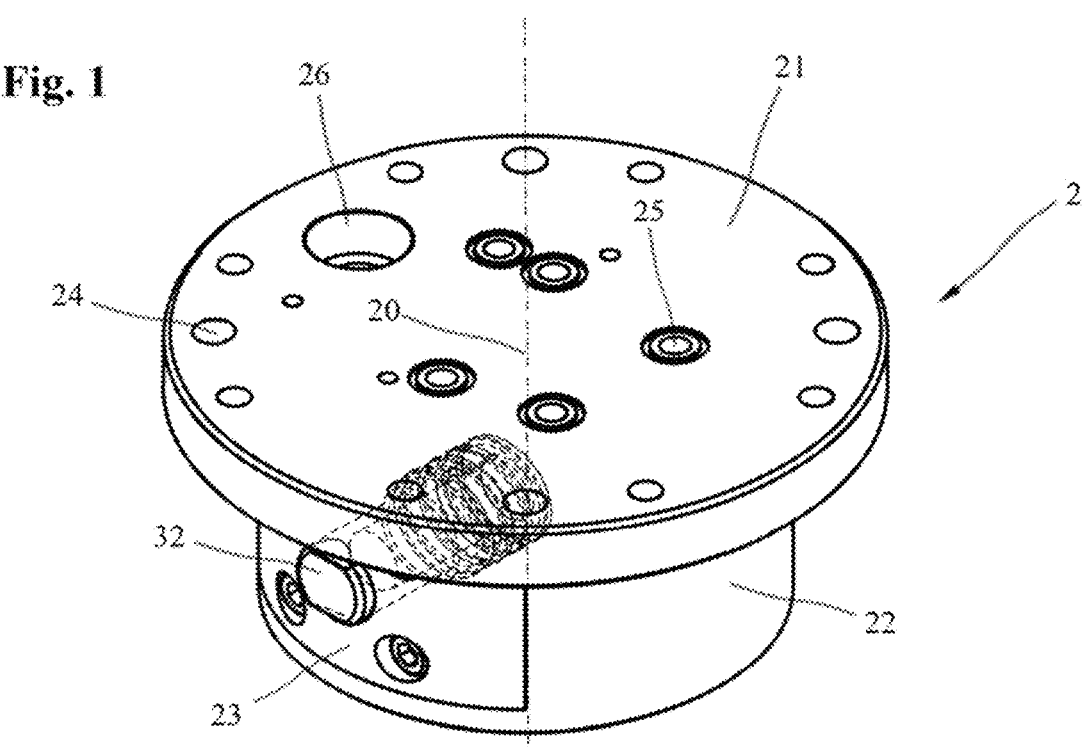
FIG. 1 a perspective view of two coupling members of a system for changing work tools in a not yet coupled state.
Figure 1:
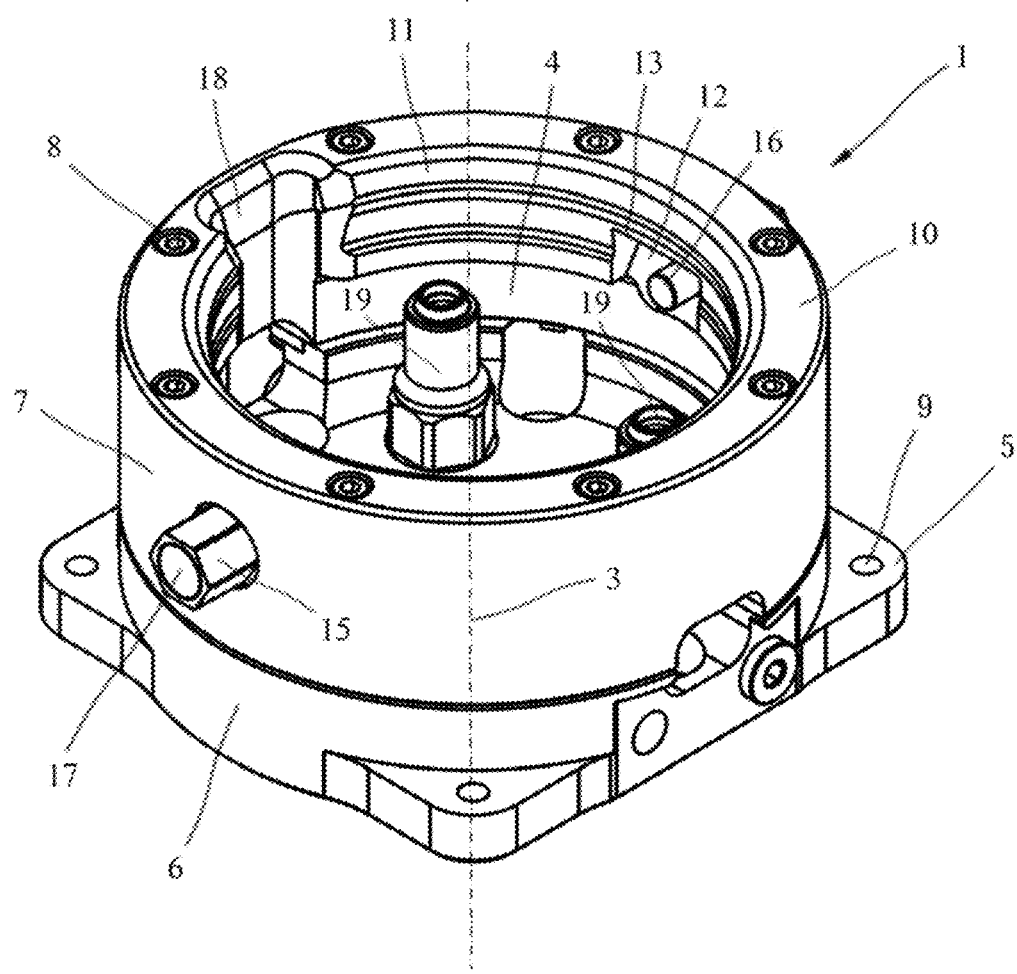
Figure 2:
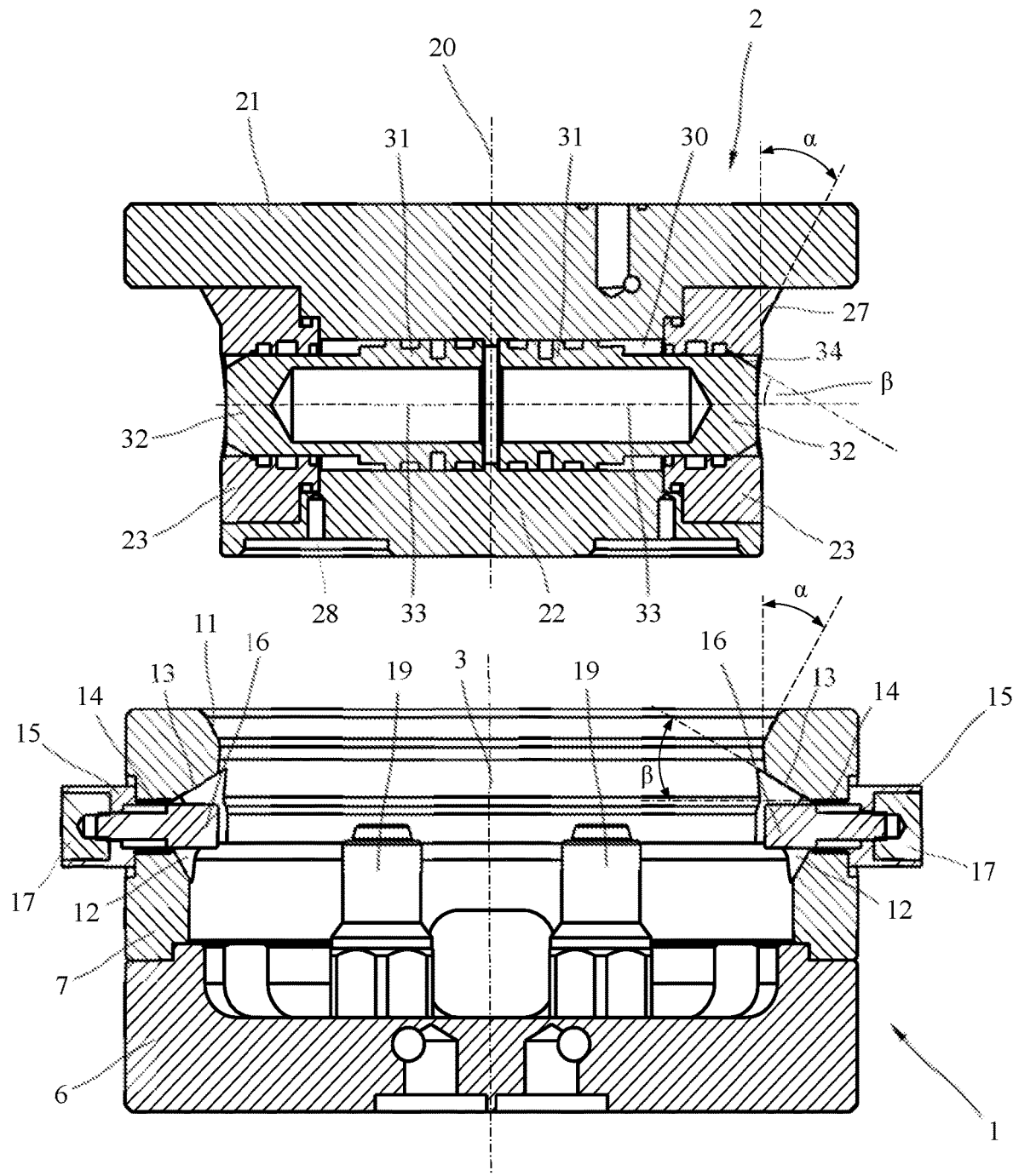
FIG. 2 a sectional view of the two coupling members in a not yet coupled state.

FIGS. 1 and 2, respectively, show a perspective view and a sectional view of an embodiment of the disclosed system for changing work tools on a loading crane, comprising a first coupling member 1 on the work tool side and a second coupling member 2 on the loading crane side in a not yet coupled state.

The first coupling member 1 to be attached to a work tool has a cup-shaped main body with a central axis 3 and a circular receiving opening 4 concentric with the central axis 3. In the configuration shown, the cup-shaped main body consists of a disk-shaped lower member 6 having flange-like connecting members 5 and a ring-shaped upper member 7 which delimits the circular receiving opening 4. The ring-shaped upper member 7 is attached to the disk-shaped lower member 6 by means of screws 8. The disk-shaped lower member 5 can be mounted on a shovel, a fork or other work tool via bores 9 in the connecting members 5. The ring-shaped upper member has a ring-shaped upper face surface 10 and, in the upper area of the receiving opening 4, a here conically designed support surface 11 for bearing the second coupling member 2.

As can be seen in particular from FIG. 2, two diametrically opposed recesses 12 with a downwardly directed, inclined abutment surface 13 are arranged on the inside surface of the ring-shaped upper member 7. Inwardly projecting actuation bolts 16 biased inwardly by a spring are guided so as to be able to move radially inside two guide sleeves 15, which are screwed into transverse bores 14 disposed in the recesses 12. An inspection bolt 17, which moves inside the guide sleeve 15, is disposed at the end of the actuation bolts 16, which projects outwardly relative to the upper member 7. The two radially movable actuation bolts 16 with the inspection bolts 17 provide a visual display for monitoring the correct locking position. Further, on the inside of the ring-shaped upper member 7, a positioning element 18 is disposed, as seen in FIG. 1, and is in the form of a longitudinal groove with a rectangular cross section. In the circumferential direction of the upper member, the positioning element 18 in the form of a longitudinal groove is offset by 90° relative to the recesses 12 and serves as a positioning aid for correctly inserting the second coupling member 2. On the disk-shaped lower member 6 of the first coupling member 1, plug-in connectors 19 are arranged, which project into the receiving opening 4 for connection to the respective mating connectors on the second coupling member 2. In this manner, it is possible to supply the work tools, e.g., with hydraulic fluid or another energy source. The coupling connectors 19 can also be designed to transmit electrical energy or electrical signals for monitoring or control purposes.

The second coupling member 2, which can be coupled to the first coupling member 1, comprises a stepped cylindrical main body with a longitudinal axis 20. In the configuration shown, the main body of the second coupling member 2 comprises a disk-shaped upper member 21 and a cylindrical guide member 22 extending along the longitudinal axis 20 and having two oppositely disposed covers 23 for engaging in the receiving opening 4 of the first coupling member 1. The disk-shaped upper member 21 and the cylindrical guide member 22 can be integrally formed in one piece. However, they can also be designed as separate components that are tightly connected to each other, e.g., by means of screws.

In the upper member 21 of the second coupling member 2, designed here in the form of a circular disk, bores 24 for mounting on a loading crane or a rotary drive are disposed. In addition, the upper member 21 comprises a plurality of connectors 25 and 26 for the supply of hydraulic fluid or the like. In the upper member 21, other connectors for the supply of electrical energy or for the transmission of control signals can be disposed as well.

Figure 3:
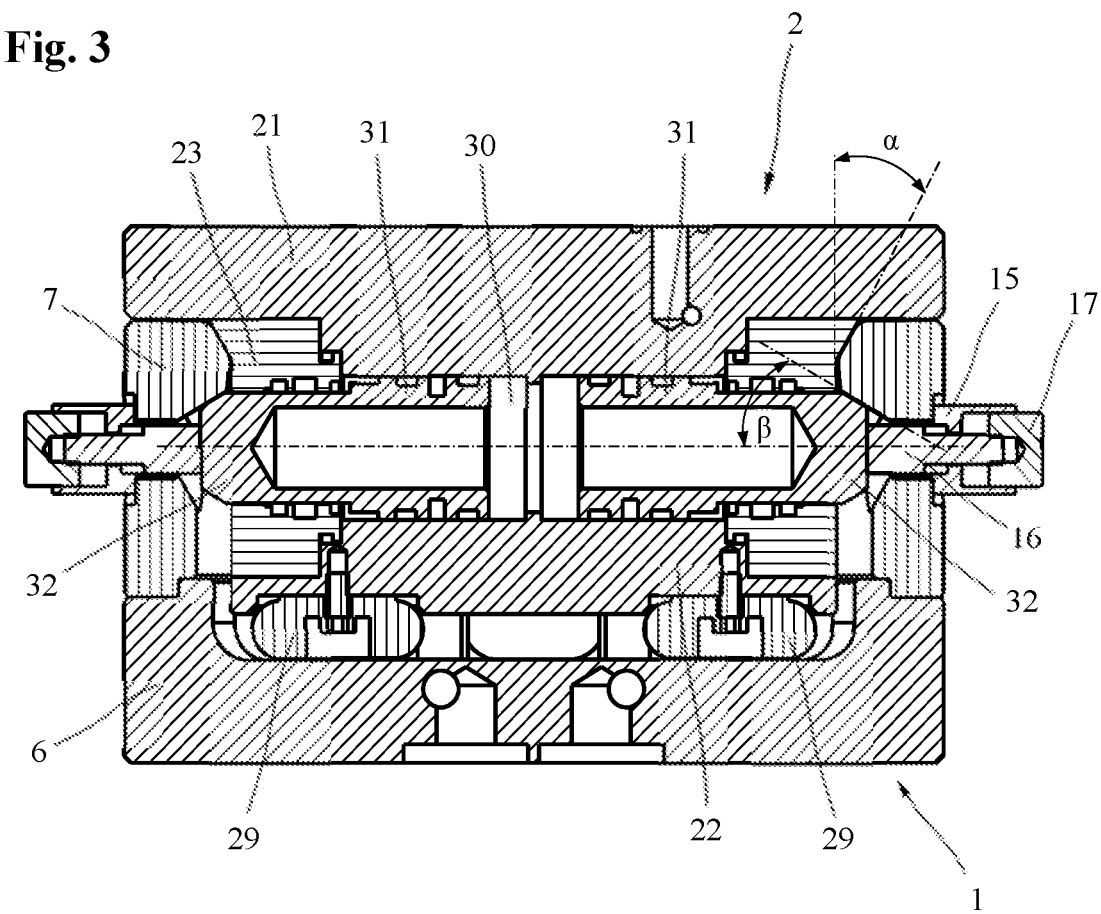
FIG. 3 a sectional view of the two coupling members in the coupled state.

The guide member 22, which is designed here in the form of a cylinder, is adapted in shape and dimensions to those of the receiving opening 4 of the first coupling member 1. The guide member 22 and the covers 23 have a conical bearing surface 27 shown in FIG. 2 for abutting the conical support surface 11 of the first coupling member 1. The conical bearing surface 27 on the second coupling member 2 and the associated support surface 11 on the first coupling member 1 have the same inclination and, in the embodiment shown, and are inclined at an angle α of 30° relative to the longitudinal axes 3 and 20. Thus, during assembly, centering, on the one hand, and connecting the coupling members 1 and 2 in a centered and accurate position, on the other hand, can be ensured. In addition, disposed on the outside of the guide member 22 is an aligning element (not shown in the drawing) in the form of a projecting piece, which is designed here in the form of a longitudinal groove, for engaging in the positioning element 18 of the first coupling member 1. The projecting piece on the guide member 22 and the associated longitudinal groove predetermine a defined inserting position for engaging the guide member 22 in the receiving opening 4 of the first coupling member 1. In this manner, it is possible to ensure that the plug-in connectors 19 disposed on the first coupling member 1 are correctly coupled to the associated mating connectors on the second coupling member 2. Additional receiving means 28 for a plurality of damping elements 29 are located on the lower surface of the guide member 22, as shown in FIG. 3.

Figure 5:
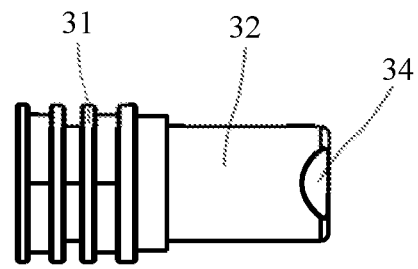
FIG. 5 a lateral view of the piston shown in FIG. 4.
Figure 4:
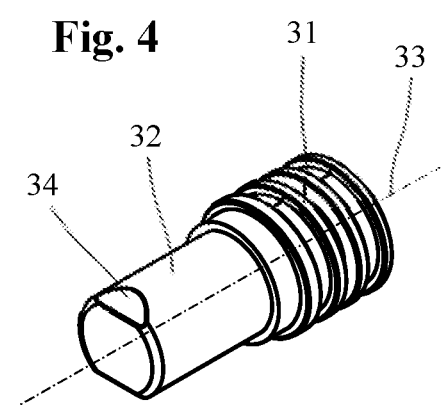
FIG. 4 a perspective view of a piston with an integrated locking element.
Figure 6:
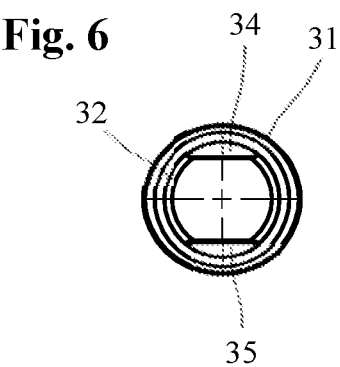
FIG. 6 a front view of the piston shown in FIG. 4.

In a through-opening 30 extending at right angles relative to the longitudinal axis 20 in the guide member 22, two pistons 31, shown separately in FIGS. 4 to 6, are movably guided at right angles relative to the longitudinal axis 20. A bolt-shaped locking element 32 for engaging in the recesses 12 of the first coupling member 1 is molded onto the two ends of the pistons 31 facing away from each other. As indicated in FIG. 4, the pistons 31 and the bolt-shaped locking elements 32 have a common longitudinal axis 33. The through-opening 30 and the two lateral covers 23 delimit a piston chamber in which the two pistons 31 can be hydraulically moved between a coupled position shown in FIG. 2 and an uncoupled position shown in FIG. 3. The piston chamber delimited by the through-opening 30 and the two covers 23 and the two pistons 31 with the associated fluid inlets create a drive, designed here in the form of a hydraulic piston drive, by means of which the two locking elements 32 can be moved between a retracted disengaged position shown in FIG. 2 and an extended retaining position shown in FIG. 3. However, electromechanical, pneumatic or any other types of drives could also be used to move the locking elements 32.

In the embodiment shown, two diametrically opposed locking elements 32 are disposed on the guide member 22. As a result, uniform and centered clamping can be achieved. However, it would also be possible to use only one locking element or more than two locking elements. In the illustrative embodiment, the longitudinal axes 33 of the pistons 31 with the integrated locking elements 32 are disposed at right angles relative to the longitudinal axis 20 of the second coupling member 2 and coaxially relative to each other. However, in alternative embodiments, the pistons 31 and the locking elements 32 could also be moved at an angle not equal to 90° relative to the longitudinal axis 20 of the second coupling member 2. Thus, a movement of the locking element 32 at right angles relative to the longitudinal axis 20 of the second coupling member 2 is not only to be understood as a movement at a right angle relative to the longitudinal axis. In addition to a radial movement component, the locking element 32 could also have an axial movement component.

In the illustrative embodiment shown, the pistons 31 are disposed with coaxial longitudinal axes 33 inside the guide member 22. However, it is also conceivable and possible to dispose one or a plurality of locking elements 32 in a different configuration, for example, instead of in diametrically opposed pairs opposite, laterally offset relative to the longitudinal axis 20 and/or at identical or opposite angles of inclination relative to the longitudinal axis 20.

FIGS. 4 to 6 show different views of a piston 31 with the integrated bolt-shaped locking element 32. The free ends of the bolt-shaped locking element 32 have a clamping surface 34, here in the form of an inclined surface, for abutting the abutment surface 13 of the first coupling member 1. As indicated in FIG. 2, the clamping surface is inclined at an angle β of 30° relative to the longitudinal axis 33. The abutment surface 13 complementary to the clamping surface 34 also inclines at the angle β. The piston 31 and the associated through-opening 30 have a slightly noncircular cross section, which prevents rotation of the piston 31. This ensures that the clamping surface 34 is always in the correct position. In the embodiment shown, the pistons 31 and the associated through-opening 30 have a slightly elliptical cross section. On the side diametrically opposed to the clamping surface 34, an additional clamping surface 35 can be provided on the free front end of the bolt-shaped locking element 32. This additional clamping surface 35 serves as a reserve clamping surface and can be utilized by rotating the piston 31 by 180° in the event of wear and tear.

The working principle of the system described above will be explained below:

For coupling, the two coupling members 1 and 2 are first aligned in such a way that the longitudinal axis 20 of the second coupling member 2 and the center axis 3 of the first coupling member 1 are aligned coaxially relative to each other. In addition, the second coupling member 2, which is disposed, e.g., on a boom of the crane or on a rotary drive, is rotated about its longitudinal axis 20 in such a way that the aligning element disposed on the second coupling member is in alignment with the positioning element 18, which here has the form of a longitudinal groove. Next, the second coupling member 2 can be moved along the longitudinal axis 20, with the cylindrical guide member 22 engaging in the receiving opening 4, toward the first guide member 1 until the lower bearing surface 27 of the second coupling member 2 comes to rest on the support surface 11 of the first coupling member 1. Due to the conical design of the support surface 11 and the bearing surface 27, a precise radial and axial alignment with a defined coupling position is ensured. Shocks potentially arising during the coupling of the two coupling members 1 and 2 can be damped or absorbed by the damping elements 29 disposed on the lower surface of the second coupling member 2.

When the lower bearing surface 27 of the second coupling member 2 rests on the support surface 11 of the first guide member 1, the two pistons 31 can be moved out of the position shown in FIG. 2 by applying appropriate pressure so that the two locking elements 32 are moved radially outward out of the retracted disengaged position shown in FIG. 2 into an extended retaining position shown in FIG. 3. This causes the upper clamping surfaces 34 of the locking elements 32 disposed in the second coupling member 2 to abut the lower abutment surfaces 13 of the first coupling member 1. Due to the design of the clamping surfaces 34 and abutment surfaces 13 in the form of inclined surfaces an axial force is generated when the locking elements 32 are being extended, by means of which the first coupling member 1 is drawn toward the coupling member 2.

When the locking elements 32 are extended into the retaining position, the actuation bolts 16 disposed in the first coupling member 1 are pushed radially pushed outward, as shown in FIG. 3, which also causes the inspection bolts 17 to be pushed radially outward relative to the guide sleeve 15. This signals to the operator that the locking element 32 has been correctly extended and that the coupling procedure has been successfully performed.

To disengage the locking mechanism, the two pistons 31 are again driven toward each other by applying appropriate pressure. This also disengages the locking elements 32 from the recesses 12 of the first coupling member 1 and retracts them into the cylindrical guide member 22. In this manner, the coupling between the first and second coupling members 1 and 2 can be disengaged.

LIST OF REFERENCE NUMBERS

1 First coupling member
2 Second coupling member
3 Central axis
4 Receiving opening
5 Connecting member
6 Lower member
7 Upper member
8 Screws
9 Bore
10 Face surface
11 Support surface
12 Recess
13 Abutment surface
14 Transverse bore
15 Guide sleeve
16 Actuation bolts
17 Inspection bolt
18 Positioning element
19 Coupling connector
20 Longitudinal axis
21 Upper member
22 Guide member
23 Cover
24 Bore
25 Connector
26 Connector
27 Bearing surface
28 Receiving means
29 Damping element
30 Through-opening
31 Piston
32 Locking element
33 Longitudinal axis of the piston
34 Clamping surface
35 Additional clamping surface

The invention claimed is:

1. A system for changing work tools on a loading crane, the system comprising:
   a first coupling member on one of a work tool side and a loading crane side with a receiving opening; and
   a second coupling member on the other of the loading crane side and the work tool side with a guide member extending along a longitudinal axis, the guide member engageable in the receiving opening of the first coupling member by moving the first coupling member and the second coupling member toward each other in a direction of the longitudinal axis,
   wherein the first coupling member comprises a support surface for axially abutting the second coupling member,
   the second coupling member comprises:
      a bearing surface that is complementary to the support surface of the first coupling member; and
      at least one locking element which is moveable by a drive at right angles relative to the longitudinal axis of the second coupling member between a disengaged position and a retaining position,
   the at least one locking element includes a clamping surface for frictionally abutting the first coupling member,
   the first coupling member includes an abutment surface that is complementary to the clamping surface of the at least one locking element so as to provide zero-play axial clamping of the first coupling member and the second coupling member when the at least one locking element is in the retaining position, and
   the clamping surface of the at least one locking element and the abutment surface of the first coupling member are designed as mutually corresponding inclined surfaces that have the same angle of inclination when the at least one locking element is in the retaining position, and
   wherein at least one bolt is radially movable within a guide sleeve disposed in the first coupling member;
   wherein the at least one bolt is radially pushed outward by the at least one locking element when the at least one locking element is moved from the disengaged position into the retaining position; and
   wherein an end of the at least one bolt protrudes outwardly from the guide sleeve relative to an exterior surface of the first coupling member, thereby providing a visual indicator of a correct locking position.

2. The system of claim 1, wherein the support surface on the first coupling member and the complementary bearing surface on the second coupling member are designed as conical surfaces.

3. The system of claim 1, wherein pairing of the clamping surface on the at least one locking element and the abutment surface on the first coupling member is designed to ensure self-locking fixation of the at least one locking element in the retaining position.

4. The system of claim 1, wherein the first coupling member has a cup-shaped main body with a central axis and a circular receiving opening coaxial with the central axis.

5. The system of claim 1, wherein the second coupling member comprises a disk-shaped upper member and a cylindrical guide member extending along the longitudinal axis for engaging in the receiving opening of the first coupling member.

6. The system of claim 1,
wherein the at least one locking element comprises two diametrically opposed locking elements disposed on the second coupling member,
the two diametrically opposed locking elements are each disposed at a right angle relative to the longitudinal axis of the second coupling member, and
the drive moves the two diametrically opposed locking elements at a right angle relative to the longitudinal axis of the second coupling member between the disengaged position and the retaining position.

7. The system of claim 1, wherein damping elements are disposed on the first or second coupling member for damping shocks when the first and second coupling members are being coupled to each other.

8. The system of claim 1, wherein the drive for moving the at least one locking element is designed as a hydraulic drive with a piston which moves inside a piston chamber, a longitudinal axis of the piston being disposed at a right angle relative to the longitudinal axis of the second coupling member.

9. The system of claim 8, wherein the piston chamber is delimited by a through-opening and two lateral covers on the guide member.

10. The system of claim 9, wherein the through-opening and the piston axially moving therein each have a non-circular cross section.

11. The system of claim 8, wherein the at least one locking element is integrally made in one piece with the piston.

12. The system of claim 1, wherein the abutment surface of the first coupling member complementarily matches the clamping surface of the at least one locking element so that the abutment surface is not at an angle to the clamping surface when the at least one locking element is in the retaining position.

13. The system of claim 1, wherein the support surface of the first coupling member and the bearing surface of the second coupling member have the same angle of inclination.

14. The system of claim 1, wherein the drive applies pressure to move the at least one locking element from the disengaged position into the retaining position and from the retaining position into the disengaged position.

15. The system of claim 1, wherein the drive is a hydraulic drive comprising a piston that moves the at least one locking element from the disengaged position into the retaining position and from the retaining position into the disengaged position.

16. The system of claim 1, wherein the at least one locking element is not biased by a spring into the retaining position.

17. The system of claim 1, wherein a visual display for monitoring the correct locking position is disposed on the first coupling member or on the second coupling member.

* * * * *